(12) United States Patent
Fang

(10) Patent No.: US 10,605,953 B2
(45) Date of Patent: *Mar. 31, 2020

(54) BUCKING TO REDUCE EFFECTS OF CONDUCTING TUBULAR

(71) Applicant: Baker Hughes, a GE company, LLC, Houston, TX (US)

(72) Inventor: Sheng Fang, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,682

(22) Filed: May 24, 2019

(65) Prior Publication Data

US 2019/0277997 A1 Sep. 12, 2019

Related U.S. Application Data

(63) Continuation of application No. 15/084,015, filed on Mar. 29, 2016, now Pat. No. 10,302,804.

(51) Int. Cl.
*G01V 3/38* (2006.01)
*G01V 3/20* (2006.01)
*G01V 3/18* (2006.01)
*G01V 3/26* (2006.01)
*G01V 3/28* (2006.01)

(52) U.S. Cl.
CPC .............. *G01V 3/38* (2013.01); *G01V 3/18* (2013.01); *G01V 3/20* (2013.01); *G01V 3/26* (2013.01); *G01V 3/28* (2013.01)

(58) Field of Classification Search
CPC ... G01V 3/18; G01V 3/20; G01V 3/26; G01V 3/28; G01V 3/38
See application file for complete search history.

(56) References Cited

U.S. PATENT DOCUMENTS

| | | | |
|---|---|---|---|
| 5,883,515 A | * | 3/1999 | Strack ................. G01V 3/28 324/339 |
| 7,046,009 B2 | | 5/2006 | Itskovich |
| 7,150,316 B2 | | 12/2006 | Itskovich |
| 7,167,005 B2 | | 1/2007 | Mercer |

(Continued)

*Primary Examiner* — Mohamed Charioui
(74) *Attorney, Agent, or Firm* — Mossman, Kumar & Tyler, P.C.

(57) ABSTRACT

Systems, devices, and methods for evaluating an earth formation. Methods include conveying a tool on a carrier in a borehole, the tool comprising a conducting tubular having a transmitter and receivers disposed thereon in a spaced-apart relationship; inducing a current in the earth formation using the transmitter; measuring with the first receiver a first time-dependent transient electromagnetic (TEM) signal induced by the formation responsive to the current; measuring with a second receiver a second time-dependent TEM signal induced by the formation responsive to the current; and using at least one processor to estimate a corrected time-dependent TEM signal using the first time-dependent TEM signal, the second time-dependent TEM signal, and a correction coefficient estimated as a function of a non-exponentiated ratio of distances $r_b$ and $r_m$ between the transmitter and the respective receivers.

17 Claims, 8 Drawing Sheets

(56) References Cited

U.S. PATENT DOCUMENTS

| | | |
|---|---|---|
| 7,167,006 B2 | 1/2007 | Itskovich |
| 8,239,172 B2 | 8/2012 | Reiderman et al. |
| 8,332,152 B2 | 12/2012 | Itskovich et al. |
| 2004/0183538 A1* | 9/2004 | Hanstein .................. G01V 3/28 324/339 |
| 2005/0093547 A1* | 5/2005 | Xiao ........................ G01V 3/28 324/339 |
| 2006/0192562 A1* | 8/2006 | Davydychev ............ G01V 3/28 324/339 |
| 2009/0248308 A1 | 10/2009 | Luling |
| 2011/0227578 A1* | 9/2011 | Hall ......................... G01V 3/28 324/343 |
| 2011/0257886 A1 | 10/2011 | Itskovich et al. |
| 2014/0121974 A1 | 5/2014 | Itskovich |
| 2015/0241592 A1 | 8/2015 | Itskovich et al. |

* cited by examiner

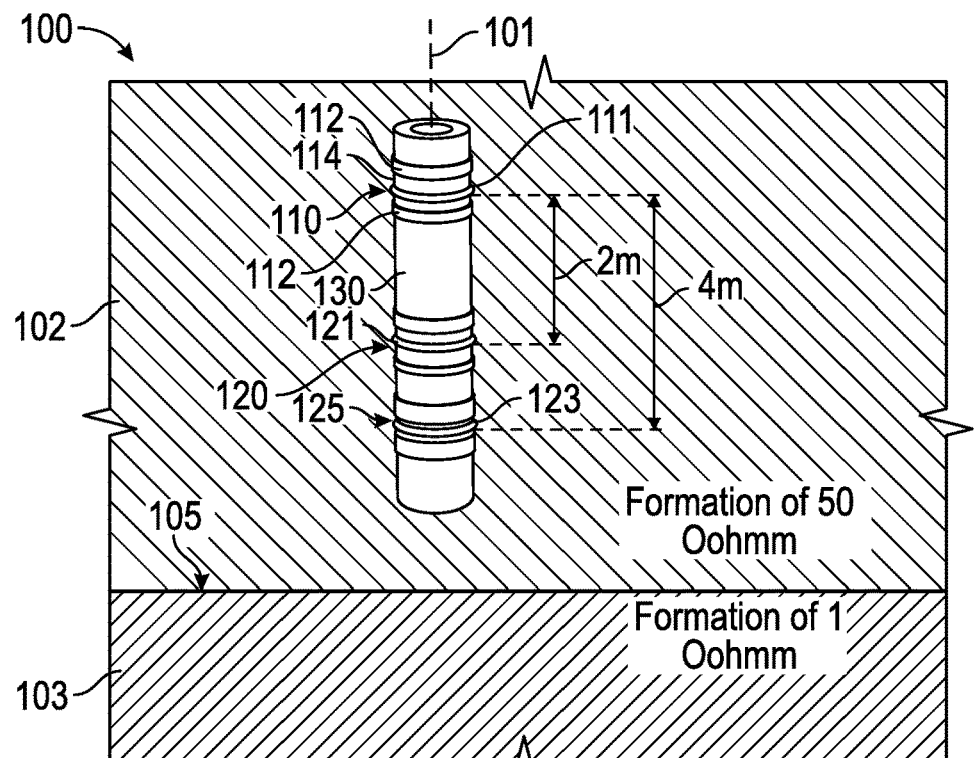
FIG. 1A
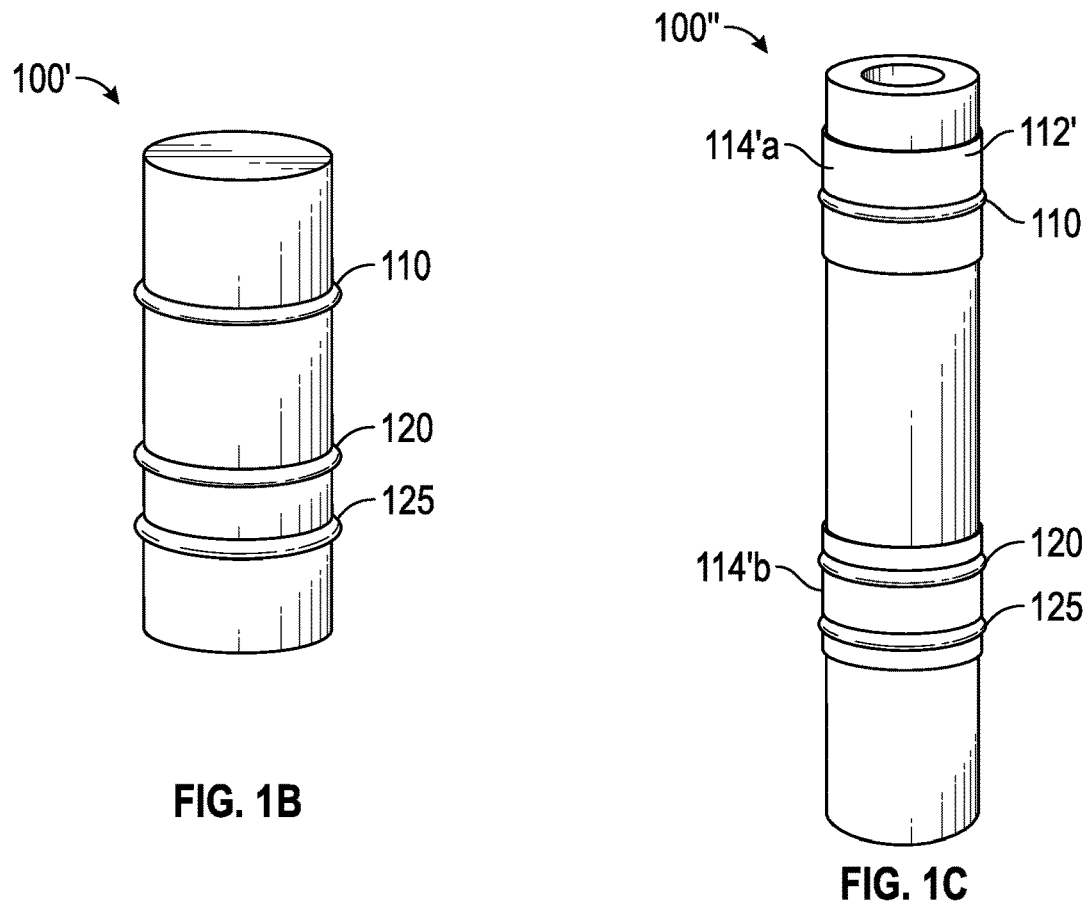
FIG. 1B
FIG. 1C

BUCKING TO REDUCE EFFECTS OF CONDUCTING TUBULAR

CROSS-REFERENCE TO RELATED APPLICATIONS

This application is a continuation of U.S. patent application Ser. No. 15/084,015, filed Mar. 29, 2016, the disclosure of which is incorporated herein by reference in its entirety.

FIELD OF THE DISCLOSURE

In one aspect, the present disclosure generally relates to methods, systems, and devices for electromagnetic well logging. More specifically, aspects of the present disclosure relate to measurements using transient electromagnetic signals.

BACKGROUND OF THE DISCLOSURE

Geologic formations are used for many purposes such as hydrocarbon and water production. Boreholes are typically drilled into the earth in order to intersect and access the formations.

Electromagnetic induction resistivity instruments have been used for some time to determine the electrical conductivity of earth formations surrounding a wellbore. More recently, development of deep looking tools based on transient field behavior, which may capable of formation evaluation at distances ranging from tens to hundreds of meters, has been attempted. In transient electromagnetic (TEM) methods, voltage or current pulses that are excited in a transmitter initiate the propagation of an electromagnetic signal in the earth formation. The transmitter and receiver may be at the surface or within the wellbore. Electric currents diffuse outwards from the proximity of the transmitter into the surrounding formation. At different times, information arrives at the measurement sensor predominantly from different investigation depths. Generally, early-time signals predominantly relate to near-zone responses (lesser depths of investigation) and late-time signals predominantly relate to remote-zone responses (greater depths of investigation).

SUMMARY OF THE DISCLOSURE

Aspects of the present disclosure include systems, methods and devices for evaluating an earth formation intersected by a borehole. Method embodiments may include conveying a tool on a carrier in a borehole, the tool including a conducting tubular. The conducting tubular may have a plurality of transmitter-receiver pairs, formed from selected ones of at least one transmitter and at least one receiver. One general embodiment of the tool includes a transmitter, a first receiver, and a second receiver disposed thereon in a spaced-apart relationship. Methods further include inducing a current in the earth formation using the transmitter; measuring with the first receiver a first time-dependent transient electromagnetic (TEM) signal induced by the formation responsive to the current; measuring with a second receiver a second time-dependent TEM signal induced by the formation responsive to the current; and using at least one processor to estimate a corrected time-dependent TEM signal using the first time-dependent TEM signal, the second time-dependent TEM signal, and a correction coefficient (K(t)) estimated as a function of a non-exponentiated ratio of distances $r_b$ and $r_m$, wherein $r_b$ is a distance between the transmitter and the first transmitter and the first receiver, and wherein $r_m$ is a distance between the transmitter and the second receiver.

Another general embodiment of the tool includes a first transmitter, a second transmitter, and a receiver disposed thereon in a spaced-apart relationship. Methods further include inducing a first current in the earth formation using the first transmitter; measuring with the receiver a first time-dependent transient electromagnetic (TEM) signal induced by the formation responsive to the first current; inducing a second current in the earth formation using the second transmitter; measuring with the receiver a second time-dependent TEM signal induced by the formation responsive to the second current at the late stage of the signal response; and using at least one processor to estimate a corrected time-dependent TEM signal using the first time-dependent TEM signal, the second time-dependent TEM signal, and a correction coefficient (K(t)) estimated as a function of a non-exponentiated ratio of distances $r_b$ and $r_m$, wherein $r_b$ is a distance between the transmitter and the first receiver, and wherein $r_m$ is a distance between the transmitter and the second receiver. Thus, generally speaking, $r_b$ and $r_m$ are distances representing spacing of the respective transmitter-receiver pairs.

The correction coefficient (K) may be computed according to $$K = \frac{M_1}{M_2} \frac{r_m}{r_b} \quad (1)$$

where $M_1$ is a magnetic moment of the first receiver, $M_2$ is a magnetic moment of the second receiver. Methods may also include estimating a non-zero differential calibration signal, $\Delta S_0(t)$, using the correction coefficient, K, and signals received at each of the first receiver and the second receiver in response to transmission of an electromagnetic pulse from the transmitter while the carrier is outside of the earth formation. The non-zero differential calibration signal may be computed according to $$\Delta S_0(t) = S_{12}(t) - K \cdot S_{11}(t) \quad (2)$$

where $S_{11}(t)$ and $S_{12}(t)$ are the signals received at each of the first receiver and the second receiver, respectively, in response to the transmission of the electromagnetic pulse from the transmitter while the carrier is outside of the earth formation, such as, for example, in air. Thus, the air-hang calibration measurement operations may be conducted prior to (and/or, in some cases, after) measurements downhole. Methods may include generating the signals received at each of the first receiver and the second receiver using the transmission of the electromagnetic pulse.

Estimating the corrected time-dependent TEM signal may include using the first time-dependent TEM signal, the second time-dependent TEM signal, and the correction coefficient (K) to estimate a differential signal $\Delta S(t)$; and estimating the corrected time-dependent TEM signal, $\Delta S_{corrected}(t)$, using the differential signal $\Delta S(t)$ and the non-zero differential calibration signal, $\Delta S_0(t)$. The corrected time-dependent TEM signal, $\Delta S_{corrected}(t)$, may be computed according to $$\Delta S_{corrected}(t) = \Delta S(t) - \Delta S_0(t). \quad (3)$$

where $$\Delta S(t) = S_{22}(t) - K \cdot S_{21}(t) \quad (4)$$

where $S_{21}(t)$ and $S_{11}(t)$ are the first time-dependent TEM signal and the second time-dependent TEM signal received at each of the first receiver and the second receiver.

The first time-dependent TEM signal and the second time-dependent TEM signal may include parasitic signal contributions from the conducting tubular, and the non-zero differential calibration signal, may be configured such that the corrected signal is substantially free of parasitic signal effects from the tubular. Methods may include using at least one processor to estimate a parameter of interest relating to the earth formation using the corrected time-dependent TEM signal. Methods may include using the parameter of interest of the earth formation to conduct further operations in the earth formation. The parameter of interest of the earth formation may be selected from: (i) a resistivity of the formation, (ii) a conductivity of the formation, (iii) a dielectric constant of the formation, and (iv) a distance to an interface in the earth formation that has a resistivity contrast across the interface. The carrier may include a bottomhole assembly including a drill bit, and the parameter of interest comprises a distance to an interface in the earth formation, and the method may include controlling a direction of drilling of the bottomhole assembly using the estimated value of the distance to the interface.

The first antenna coil may include a first number of turns of a wire and the second antenna coil comprises a second number of turns of the wire different than the first number of turns. The conductive tubular may include at least one reduced conductivity composite material.

Apparatus embodiments may include a tool on a carrier in the borehole, the tool comprising a conducting tubular; a transmitter disposed on the conducting tubular and configured to induce a current in the earth formation while the tool is in the borehole; a first receiver and a second receiver disposed on the conducting tubular in a spaced-apart relationship, wherein the first receiver and the second receiver are each configured to measure a first time-dependent transient electromagnetic (TEM) signal induced by the formation responsive to the current; at least one processor configured to estimate a corrected time-dependent TEM signal using the first time-dependent TEM signal, the second time-dependent TEM signal, and a correction coefficient (K) estimated as a function of a non-exponentiated ratio of distances $r_b$ and $r_m$, wherein $r_b$ is a distance between the transmitter and the first receiver, and wherein $r_m$ is a distance between the transmitter and the second receiver.

The carrier may include a bottomhole assembly including a drill bit, and the parameter of interest of the earth formation comprises a distance to an interface in the earth formation, and the at least one processor is configured to control a direction of drilling of the bottomhole assembly using the estimated value of the distance to the interface. Methods may include estimating the resistivity property for a portion of the earth formation ahead of the drill bit.

The at least one processor may be configured to estimate a parameter of interest of the earth formation using first and second transient signals to derive a corrected signal substantially unaffected by the tubular. Alternatively, or additionally, the at least one processor may be further configured to estimate a value of a parameter of interest of the earth formation by performing an inversion using a 1-D model without using a representation of the conducting tubular.

Some embodiments include a non-transitory computer-readable medium product accessible to the processor and having instructions thereon that, when executed, causes the at least one processor to perform methods described herein. Apparatus embodiments may include at least one processor and a computer memory accessible to the at least one processor comprising having instructions thereon that, when executed, causes the at least one processor to perform methods described herein.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 1A-1D illustrate transmitter and receiver configurations for tools for use in transient electromagnetic (TEM) logging in accordance with embodiments of the present disclosure.

DETAILED DESCRIPTION

Figure 1D:
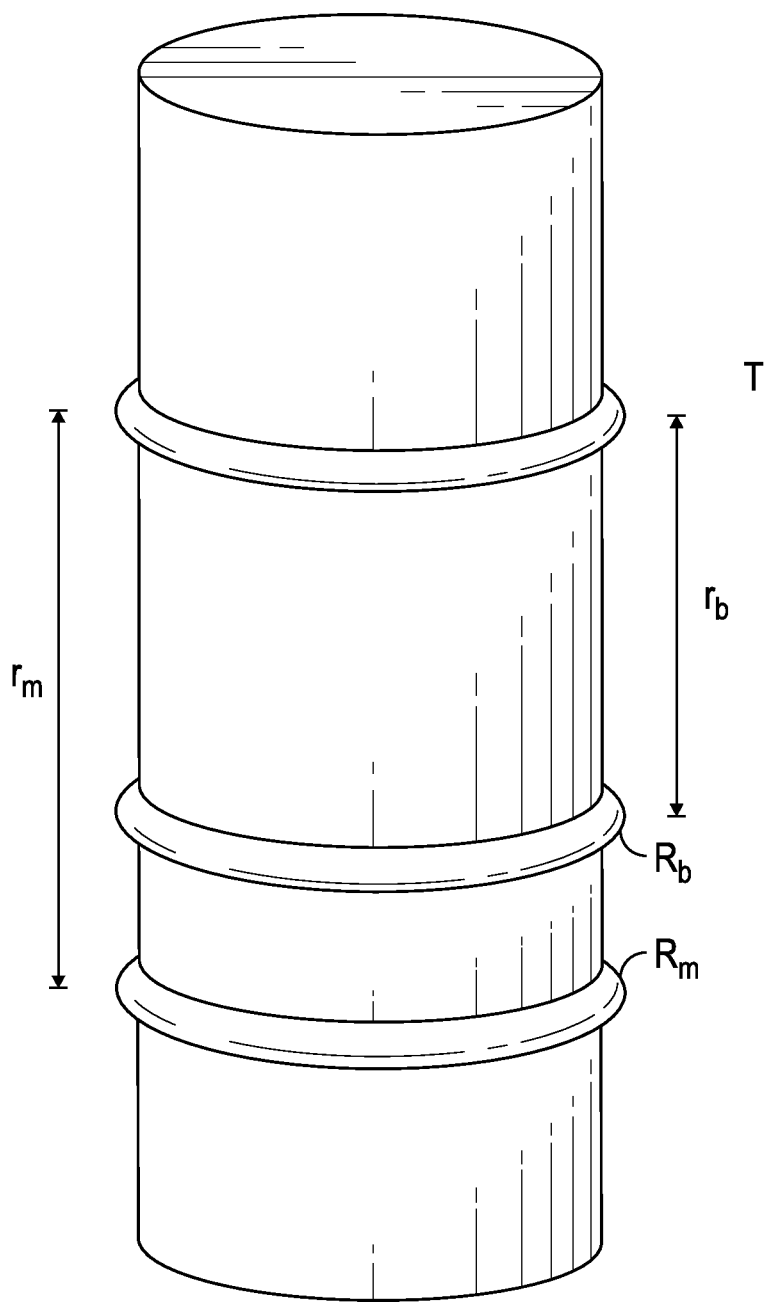

Aspects of the present disclosure relate to apparatuses and methods for electromagnetic induction well logging for evaluating an earth formation. Some aspects relate particularly to estimating properties of the formation relating to transient electromagnetic (TEM) measurements. The formation may be intersected by a wellbore which is formed by a bottom hole assembly ('BHA') of a drill string. The TEM measurements are taken in the wellbore, and may be used to estimate a parameter of interest. More specifically, the present disclosure relates to techniques enabling deep measurement-while-drilling ('MWD') resistivity measurements suitable for geo-steering and measurements ahead of the bit.

Aspects of the present disclosure mitigate parasitic electrical effects of a tubular (e.g., drillpipe, drill collar) in the drillstring through techniques for making and processing signals to provide more accurate estimation of parameters of interest (e.g., physical properties) of the formation. Apparatus embodiments are capable of extracting information about resistivity and other parameters of the formation while using a conductive BHA.

Parameters of the earth formation may be estimated using signals obtained in the borehole via electrical phenomena. The measurement may include characterizing or recording transient signals in a pair of receiver loops when current is switched off in a transmitter (e.g., a transmitter coil) placed at some distance from the receivers.

One aspect of measurement-while-drilling (MWD) applications is the estimation of the distance from the drillbit to an interface in the earth formation that has a resistivity contrast across the interface. The interface may be a bed boundary and/or a fluid interface between a non-conducting fluid (e.g., a hydrocarbon) and a conducting fluid (e.g., brine).

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Transient electromagnetic (TEM) tools are configured to effect changes in a transmitter to induce a time-dependent current in a formation. Transient signals occur in the receiver antennas, which are induced by the eddy currents in the formation. The induced signals contain information about formation characteristics. Thus, the receiver produces a response indicative of formation characteristics, such as, for example, a resistivity property of the formation. Electronics may be configured to measure the time-dependent transient electromagnetic (TEM) signal induced by the eddy currents in the formation.

In a typical transient induction tool, a magnetic dipole is abruptly reversed at the transmitter loop. For example, current in a transmitter coil drops from its initial value $I_0$ to 0 at the moment $t=0$. Subsequently, measurements are taken while the rotating tool is moving along the borehole trajectory. The currents induced in the formation and the drillpipe begin diffusing from the region close to the transmitter coil in all the directions surrounding the transmitter. These currents induce electromagnetic field components which can be measured by receivers (e.g., induction coils) placed along the conductive pipe at some distance from the transmitter. U.S. Pat. Nos. 7,167,006; 7,150,316; 7,046,009, which relate to details of TEM measurements, are commonly assigned to the assignee of the present invention and are hereby incorporated by reference herein in their entirety.

It would be desirable to have deep transient measurements (i.e., greater than 30 meters) for geosteering and other purposes. Currently, the main obstacles preventing deep geo-steering beyond 30 meters using transient electromagnetic measurements are caused by the presence of the ubiquitous metal drillpipe; typically, drilling tubular is made of steel. Signal contributions due to the eddy currents in the pipe are parasitic. The signal due to these currents can be much larger (by several orders of magnitude) than the signal from the formation at the time interval where parameters of interest manifest themselves. In the case of measurements ahead of the bit, positioning of the induction system with respect to the drill bit presents another complication. The first 3-4 meters in the vicinity of the drill bit are not available for transmitter/receiver placement, because equipment supporting the drilling process occupies this space. If it is desirable to look about 5 meters ahead of the bit, the transmitter/receiver system would be separated from the region of interest by 8-9 meters of distance, which compounds signal issues.

The measured transient signal is severely affected by the eddy currents in the pipe that limit resolution of the measurements of the formation parameters, such as, for example, distance to a resistivity boundary. By maximizing the distance between transmitter and receiver it is possible to reduce the influence of the drillpipe signal while increasing the contribution of the signal from the formation. However, such systems result in a limited resolution with respect to the parameters of interest, and the dimensional requirements of such systems (up to 30 meters) may be prohibitive for MWD applications. It would be desirable to mitigate the parasitic signals caused by eddy currents in the drilling tubular in transient field signal detection methods at lesser distances between transmitter and receiver.

In conventional induction logging, a fixed "wound-counter-wound" turn ratio between two receiver electrodes R1 and R2 may be used. It is generally understood that such an arrangement advantageously achieves the objective of reporting a signal in the absence of anything but air proximate to the measurement tool that may be treated as zero. However, for late-stage signals, this approximation introduces inaccuracies.

Aspects of the present disclosure relate to processing signals to remove a parasitic component of the received signal resulting from a conductive tubular. Aspects of the present disclosure relate to the use of transient electromagnetic (TEM) tools in connection with drilling. The tools may have two operational modes: the first mode may be used to define a correction coefficient, and the second mode may be used to provide information about properties of the formation or other parameters of interest using the correction coefficient.

To attenuate parasitic effects of currents in the drill pipe prior to processing, a dual-transmitter correction system may be employed having magnetostatic shields (e.g., ferrite) in combination with a highly conductive electromagnetic (e.g., copper) shields in close proximity to the coils. The magnetostatic shielding substantially reduces (attenuates) eddy currents in the portion of the conductive tubular covered by the magnetic material. The conductive shielding substantially reduces the contribution of the eddy currents induced in the copper shield relative to the contribution of the eddy currents induced in the formation into the measured signal. This preserves resolution of the transient signal to the remote resistivity boundaries.

In conventional signal bucking known to the art, transient calibration measurements may be made in a homogenous zone, such as in air (i.e., with no formation around), and two signals $C_1(t)$ and $C_2(t)$, attributable to R1 and R2, respectively, are received. A time-dependent bucking coefficient may be estimated using a processor. For example, the bucking coefficient may be estimated by minimizing the difference between $C_1(t)$ and $C_2(t)$ in a least square sense. For example, estimating $K(t)$ may be carried out by finding $$K(t) = k(t) \frac{M_1}{M_2} \frac{r_m^3}{r_b^3}$$

corresponding to $$\left| \sum_{i=1}^{N} \left( C_1(t_i) - k(t_i) \frac{M_1}{M_2} \frac{r_m^3}{r_b^3} C_2(t_i) \right)^2 \right|_{min}, \tag{5}$$

wherein $C_1$ is the first time-dependent TEM signal and $C_2$ is the second time-dependent TEM signal, $M_1$ is a magnetic moment of the first receiver, $M_2$ is a magnetic moment of the second receiver, $r_b$ is the distance from the first receiver to the transmitter and $r_m$, is the distance from the second receiver to the transmitter, and N is a number of measurement samples at corresponding discrete times $t_i$. As another conventional alternative, the bucking coefficient can be estimated according to the formula:

$$K(t) = \frac{M_1}{M_2} \frac{r_m^3}{r_b^3}, \quad (6)$$

wherein $M_1$ is a magnetic moment of the first receiver, $M_2$ is a magnetic moment of the second receiver, $r_b$ is the distance from the first receiver to the transmitter and $r_m$ is the distance from the second receiver to the transmitter.

Aspects of the present disclosure further mitigate parasitic signal effects using a novel correction technique. Note that these effects may be previously attenuated using the design features described above, or other techniques known in the art. Correction techniques using two receiver coils are known. However, in accordance with embodiments of the present disclosure, further mitigation of the parasitic effect may be achieved by using novel techniques to correct for the tubular signal and recover the formation signal.

FIGS. 1A-1D illustrate transmitter and receiver configurations for tools for use in transient electromagnetic (TEM) logging according to embodiments of the present disclosure. Referring to FIG. 1A, tool 100 includes a conducting tubular 130. The tool may include a transmitter 110 and receivers 120 and 125 disposed along tubular 130. Transmitter 110 may include an induction antenna, such as transmitter coil 111, as part of an antenna assembly. Receivers 120 and 125 may each include an induction antenna, such as receiver coils 121, 123, as part of antenna assemblies. Other embodiments may include additional transmitters or receivers.

The transmitter 110 may be configured to induce a time-dependent current in the formation. For example, the antenna coils 111 may be coupled with a current source by measurement circuitry to produce a time-varying current in the antenna coils 111. The receivers 120, 125 may be configured to convert a time-dependent transient electromagnetic signal induced by the formation responsive to the current into an output signal. The tool 100 may be configured to cause the transient electromagnetic signal by abruptly changing a magnetic moment of the transmitter 110. This may be carried out by switching a current on and off in the transmitter coils to generate pulses. The transmitter 110 may include an antenna coil coupled with a current source and a magnetic core having residual magnetization.

Switching current in the antenna coil results in magnetization reversal in the magnetic core and change in magnetic dipole moment of the antenna. Some embodiments may use a particular antenna for both transmitting and receiving signals and/or as bucking coils or other bucking components.

The drill collar is further provided with a plurality of localized, conductive electromagnetic shielding regions 112, each region 112 being centered around the transmitter coil 111 or either of the receiver coils 121, 123. In the disclosed embodiment, the electromagnetic shielding regions 112 are created by covering a plurality of surfaces of the tubular with highly conductive copper coating. The plurality of surfaces may overlap the first and the second of the plurality of transmitters and the receiver. Coated regions 112 may reduce the effects of direct coupling between transmitter and receiver coils. In accordance with one aspect of the invention, regions 112 are short, i.e., less than one meter; in some embodiments, regions 112 are 0.75 m in length.

In other implementations, a single, unitary shielded region may be employed, which encompasses the plurality of transmitters (e.g., including all of the transmitters), the receiver coil, or combinations of transmitters and receivers, including a single, unitary shielded region extending along the longitudinal axis 101 of the tool across all the antennas of the tool.

The drill collar is further provided with a plurality of localized non-conductive magnetostatic shielding regions 114, similarly centered on the transmitter coil 111 or either of the receiver coils 121, 123. These magnetostatic shielding regions 114 may comprise, for example, a non-conductive ferrite coating or insert. The magnetostatic shielding regions 114 may reduce the effects of eddy currents induced in conductive tubular 130. In the presently disclosed embodiment, each region 114 is approximately 0.1 meters in axial length, centered on the respective coils.

Magnetostatic shielding 114 may be defined as a soft magnetic material of high (~1000 H·m$^{-1}$) permeability, such as, for example, ferrite. The magnetostatic shielding may reduce the intensity of the eddy currents in the pipe and, as a result, diminish the parasitic effect from the pipe. The shielding may be several meters in length.

In other implementations, a single, unitary shielded region may be employed, which encompasses the plurality of transmitters (e.g., including all of the transmitters), the receiver coil, or combinations of transmitters and receivers, including a single, unitary shielded region extending along the longitudinal axis 101 of the tool across all the antennas of the tool.

Returning to FIG. 1B, tool 100' includes a tubular 130' without shielding. Referring to FIG. 1C, tool 100" includes a conductive tubular 130 covered with single, unitary electromagnetically shielded region 112. The tubular is provided with a localized magnetostatic shielding 114a' for transmitter 110, while receiver 120 and receiver 125 share magnetostatic shielding 114b'. Other embodiments may include a plurality of inserts with transmitters or receivers disposed on them—either sharing an insert, or alternatively, each antenna having a corresponding insert. Further implementations may use a set of coatings and/or inserts axially surrounding transmitter 110 and receivers 120 and 125, alone or collectively.

Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.).

In operation, tool 100 is configured to effect changes in the transmitters to induce a time-dependent current in the formation. Transient signals occur in the receiver antennas that are induced by the formation responsive to the current. The induced signal contains information about formation characteristics. Thus, the receiver produces a response indicative of formation characteristics, such as the parameter of interest. A processor is configured to measure the time-dependent transient electromagnetic (TEM) signal induced by the formation.

TEM tool 100 lies next to a formation interface 105. Transmitters 110 and 115 and receiver 120 lie along a common axis 101 that is vertically positioned in the upper half-space 102 perpendicular to the interface and is separated by a distance from the interface. In this example, the transmitter-receiver spacing is 2 and 4 meters, respectively. The term "interface" includes a fluid interface between two different fluids in an earth formation (e.g., a fluid front) as well as a boundary between two different geologic or stratigraphic intervals in the earth (e.g., distance to bed). Examples following use distance to bed for convenience of illustration, but it should be readily apparent that embodiments wherein distance to an interface of a different type is estimated are within the scope of the disclosure. The upper half-space 102 has a resistivity of 50 Ω-m and the remote formation (lower half-space) 103 is shown to have a resistivity of 1 Ω-m. It should be noted that the coaxial transmitter-receiver configuration shown herein is not to be construed as a limitation and any suitable arrangement including but not limited to an arrangement having a transverse transmitter and/or a transverse receiver may be used.

FIG. 1D illustrates aspects of the present disclosure. The tool 180 includes a transmitter 181 (T) a bucking receiver 182 ($R_b$) and a main receiver 183 ($R_m$), all of which are coaxial with the conducting tubular 184 (e.g., drilling tubular, or 'drill pipe'). The transmitter 181 (T) is spaced a distance $r_b$ along a longitudinal axis of the tool 180 from the bucking receiver 182 ($R_b$). The transmitter 181 (T) is spaced a distance $r_m$ along a longitudinal axis of the tool 180 from the main receiver ($R_m$).

Traditional tool-dimension based bucking algorithms estimate a differential signal using a bucking coefficient modeled using a multiple exponent of the ratio of transmitter-to-receiver distances. That is, the coefficient is modeled using the ratio raised to the $n^{th}$ power, where n is greater than 2. In contrast, aspects of the present disclosure utilize a non-exponentiated ratio of distances between respective transmitter-receiver pairs in conjunction with novel techniques.

In aspects of the present disclosure, revisiting Eqns. 1-3, a non-zero signal is determined from measurements in air using $$\Delta S_0(t) = S_{12}(t) - K \cdot S_{11}(t). \quad (2)$$

wherein the signals $S_{11}(t)$ and $S_{12}(t)$ are transient measurements in air, which correspond to receivers $R_m$ and $R_b$ (R1 and R2), respectively, and $$K = \frac{M_1}{M_2} \frac{r_m}{r_b}, \quad (1)$$

wherein $M_1$ is a magnetic moment of the first receiver, $M_2$ is a magnetic moment of the second receiver, $r_b$ is the distance from the first receiver to the transmitter and $r_m$ is the distance from the second receiver to the transmitter. Notice that distances between transmitter-receiver pairs may also be used to find the differential signal in a dual-transmitter, single-receiver arrangement by making appropriate substitutions in the equations above. The non-zero signal ($\Delta S_0(t)$) is a correction factor which may be subtracted from real measurements downhole.

Figure 2:
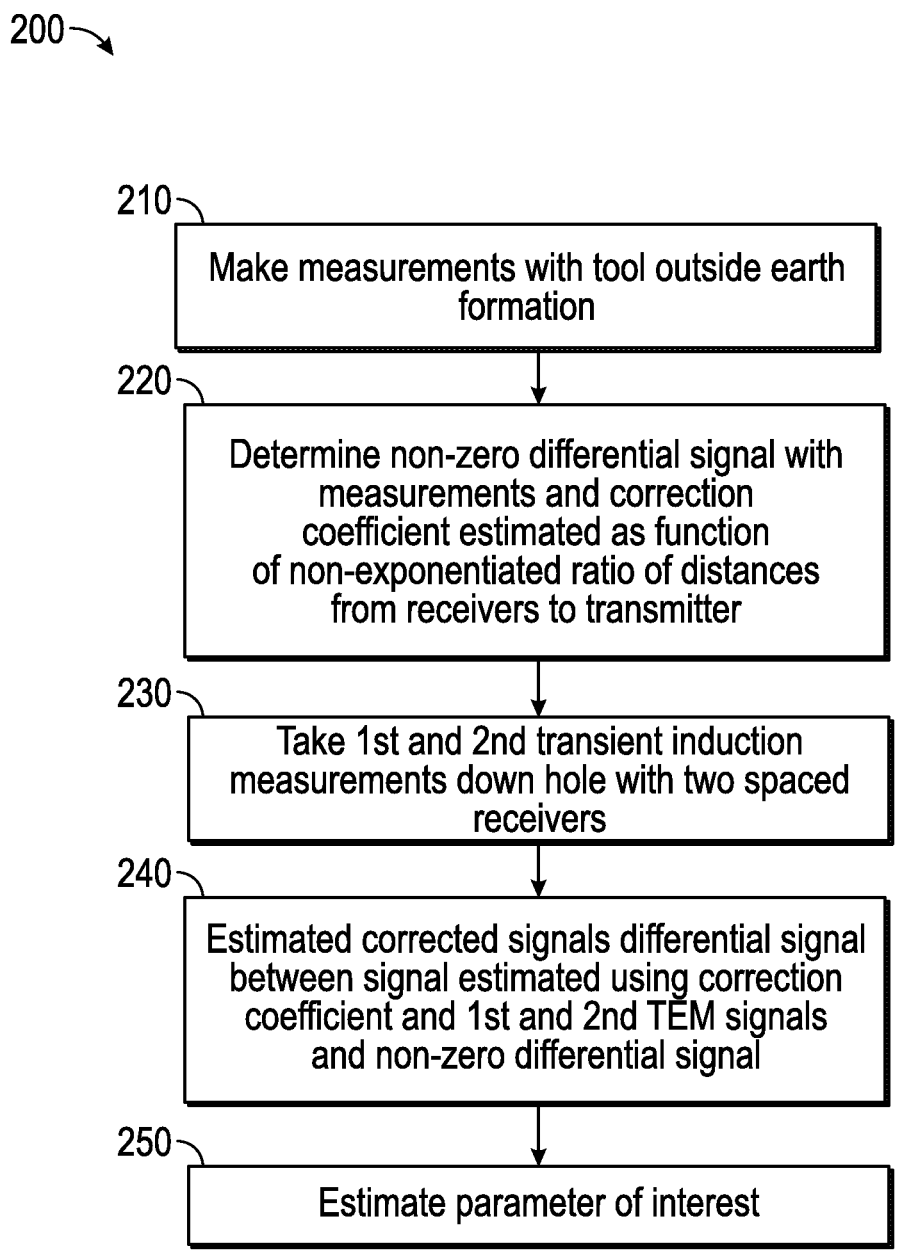
FIG. 2 illustrates methods in accordance with embodiments of the present disclosure.

FIG. 2 illustrates methods in accordance with embodiments of the present disclosure. Method 200 may be carried out by varying the order of steps as listed here or by performing one or more steps simultaneously with portions or all of other steps. Optional step 210 of method 200 comprises performing pulse induction measurements outside of the borehole. Preferably, this calibration is done in the presence of only the pipe and two receivers R1 and R2, i.e., with the tool in air. Such a measurement may be referred to as an air-hang measurement. The two received signals are referred to here as $S_{11}(t)$ and $S_{12}(t)$. The signals $S_{11}(t)$ and $S_{12}(t)$ correspond to receivers R1 and R2, respectively.

Next, in optional step 220, a non-zero differential signal is determined from the measurements $S_{11}(t)$ and $S_{12}(t)$ using a time-independent coefficient K representative of $$K = \frac{M_1}{M_2} \frac{r_m}{r_b}, \text{ using}$$

$$\Delta S_0(t) = S_{12}(t) - K \cdot S_{11}(t). \quad (2)$$

wherein $M_1$ is a magnetic moment of the first receiver, $M_2$ is a magnetic moment of the second receiver, $r_b$ is the distance from the first receiver to the transmitter and $r_m$ is the distance from the second receiver to the transmitter, and ($\Delta S_0(t)$) is the non-zero differential calibration signal in air estimated from the signals. The correction coefficient may be calculated for the particular tool dimensions and associated with the tool in a look-up table or the like for later use. The first and second steps 210 and 220 constitute a calibration mode.

In step 230, transient induction measurements are taken downhole to acquire two signals $S_{21}(t)$ and $S_{22}(t)$ corresponding to receivers R1 and R2, respectively. This may be carried out by inducing a first current in the earth formation using a transmitter, such as for example, by abruptly changing a magnetic moment of the transmitter in the borehole, and measuring with the first receiver a first time-dependent transient electromagnetic (TEM) signal induced by the formation responsive to the current, which produces a first TEM measurement, and with a second receiver a second time-dependent transient electromagnetic (TEM) signal induced by the formation responsive to the current, which produces a second TEM measurement. Each signal may be generated in the respective receiver (or indicative of the signal generated in the receiver) and caused by the formation responsive to the current.

In step 240, the two downhole signals $S_{21}(t)$ and $S_{22}(t)$ are used to estimate a differential signal $\Delta S_{corrected}(t)$ in accordance with the equation:

$$\Delta S_{corrected}(t) = \Delta S(t) - \Delta S_0(t); \quad (3)$$

wherein $$\Delta S(t) = S_{22}(t) - K \cdot S_{21}(t). \quad (4)$$

where K, as calculated in the calibration step above, is used again. The resulting $\Delta S_{corrected}(t)$ then represents a corrected signal which has been modified to mitigate any signal effects of the conducting tubular, and which is employed in further processing to estimate parameters of interest (step 250).

Other optional steps include estimating a parameter of interest of the formation using the corrected signal, and conducting further operations in the earth formation in dependence upon estimated parameters, or upon models created using ones of these. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) evaluating the formation; and x) producing one or more hydrocarbons from the formation.

In some embodiments, the borehole may be utilized to recover hydrocarbons. In other embodiments, the borehole may be used for geothermal applications, water production, mining, tunnel construction, or other uses.

Herein, the term "information" may include one or more of: raw data, processed data, and signals. The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

Measurements, coefficients, and estimated parameters may be stored (recorded) as information or visually depicted on a display. Aspects of the present disclosure relate to modeling a volume of an earth formation using an estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Figure 3:
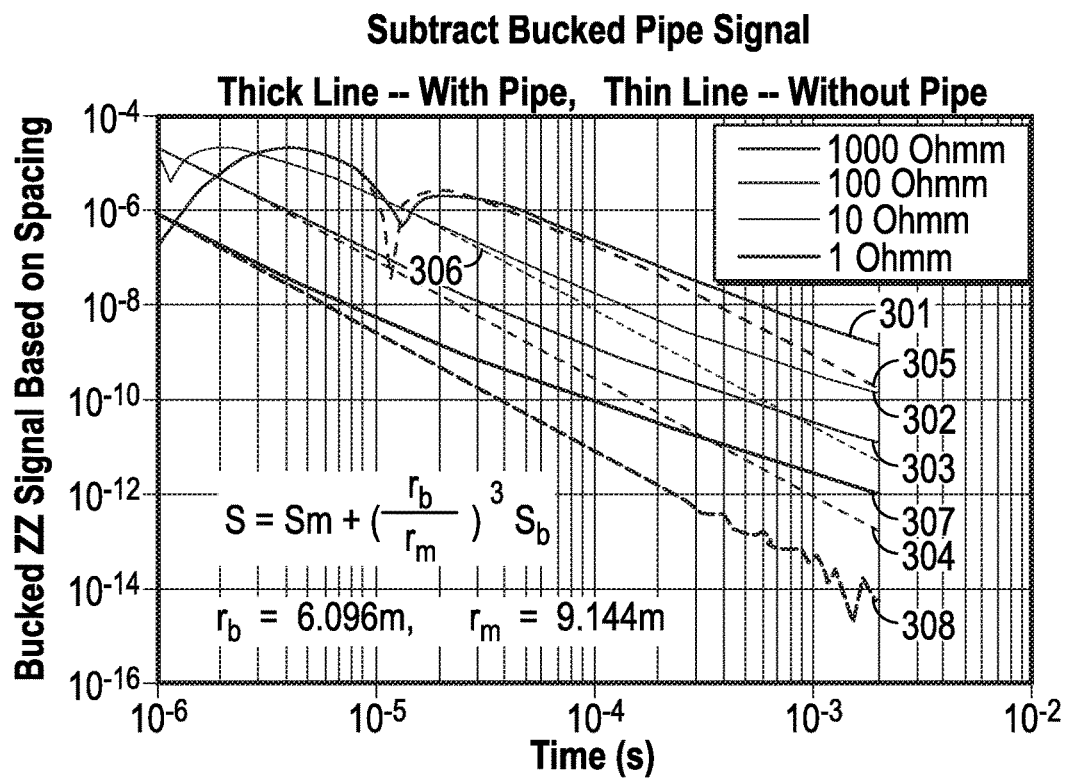
FIG. 3 shows a graphical depiction of modeling results where an output signal in the presence of homogeneous formation derived using traditional bucking techniques is compared with a one-dimensional signal from the earth formation in the absence of conductive pipe.
Figure 4:
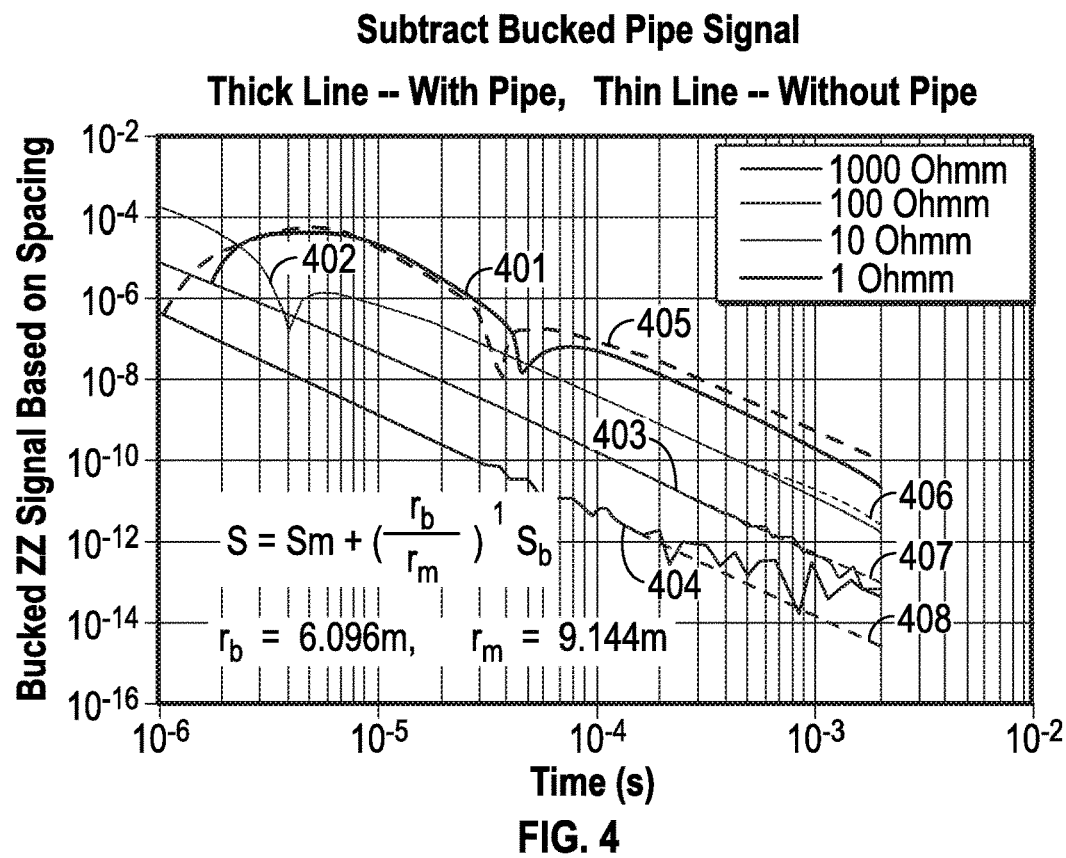
FIGS. 4 and 5 show graphical depictions of modeling results where a corrected output signal in the presence of homogeneous formation derived using techniques of the present disclosure are compared with one-dimensional signals from the earth formation in the absence of conductive pipe.
Figure 5:
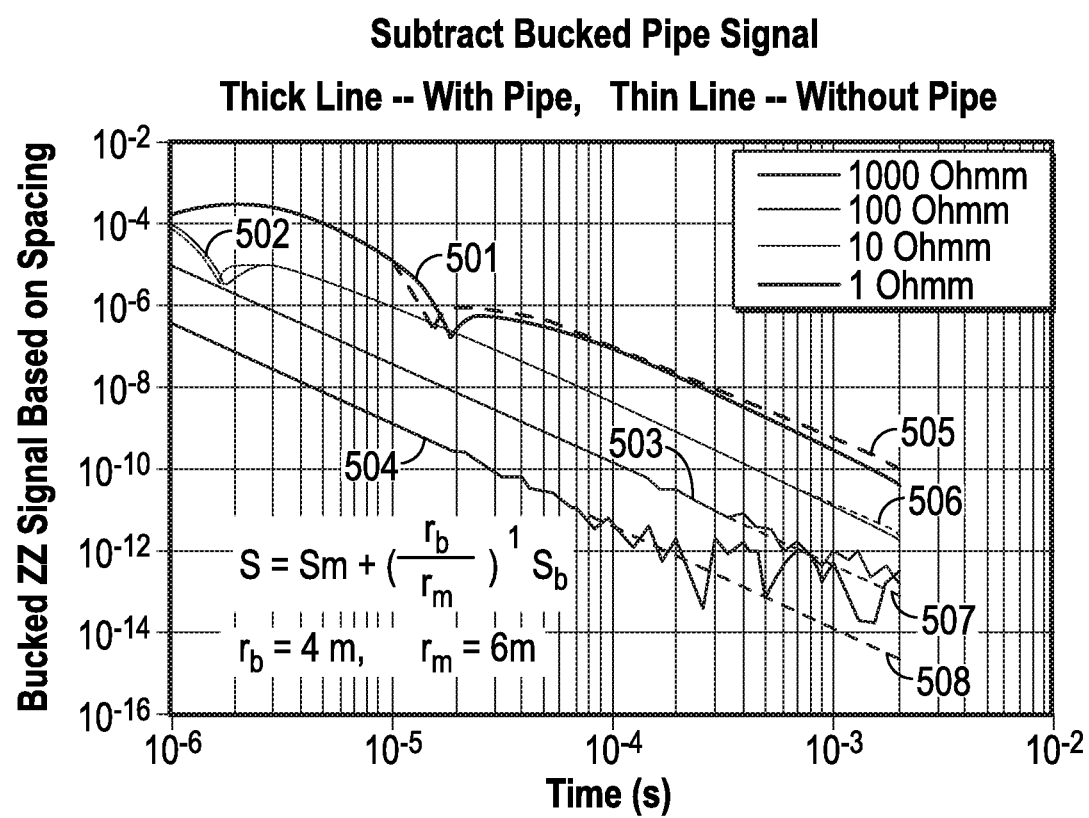

FIGS. 3-5 are graphical depictions of modeling results where an output signal in the presence of homogeneous formation is compared with a one dimensional signal from the earth formation in the absence of conductive pipe. In FIG. 3, the corrected signal is obtained by combining the signals from the two receivers using known bucking methods. In FIGS. 4 & 5, the corrected signal is obtained using techniques of the present disclosure, described herein. We present numerical modeling results for the transient system illustrating the effectiveness of techniques in accordance with the present disclosure.

Referring to FIG. 3, curves 301-304 represent a modeled bucked signal in the presence of a conductive pipe for various formation resistivities, and curves 305-308 represent a modeled signal in the absence of a conductive pipe (i.e., alone) for various formation resistivities. FIG. 3 illustrates modeled corrected responses of a coaxial (ZZ) tool in accordance with techniques of the present disclosure, but using the cubed distance ratio model. That is, FIG. 3 illustrates modeled responses wherein the correction coefficient is estimated using $$K(t) = \frac{M_1}{M_2} \frac{r_m^3}{r_b^3}, \tag{7}$$

Responses are measured (in Volts) as the ordinate and the time is shown (in seconds) as the abscissa.

For the bucked signals, a bucking coefficient is used based on a cubed ratio of transmitter-receiver pair distances, as is known in the art. The pipe has an undercompensated effect on the signal which may be observed to begin at about 0.1 millisecond (ms) in a homogeneous formation with a resistivity of 1 ohmm.

FIG. 4 illustrates modeled corrected responses of a coaxial (ZZ) tool in accordance with techniques of the present disclosure. Curves 401-404 represent modeled corrected signals in the presence of a conductive pipe for various formation resistivities, and curves 405-408 represent modeled signals in the absence of a conductive pipe (i.e., alone) for various formation resistivities. FIG. 4 illustrates responses from a tool having a spacing of $r_b$=6.096 meters, $r_m$=9.144 meters. To determine the modeled corrected signals, a correction coefficient is determined based on a non-exponentiated ratio of transmitter-receiver pair distances. That is, FIG. 4 illustrates modeled responses wherein the correction coefficient is estimated using Eqn. (1). Responses are measured (in Volts) as the ordinate and the time is shown (in seconds) as the abscissa.

FIG. 5 illustrates modeled corrected responses of a coaxial (ZZ) tool in accordance with techniques of the present disclosure, the tool having a spacing of $r_b$=4 meters, $r_m$=6 meters. Referring to FIG. 5, curves 501-504 represent modeled corrected signals in the presence of a conductive pipe for various formation resistivities, and curves 505-508 represent modeled signals in the absence of a conductive pipe (i.e., alone) for various formation resistivities. A correction coefficient is determined based on a non-exponentiated ratio of transmitter-receiver pair distances for modeled corrected signals, as in FIG. 4.

Figure 6A:
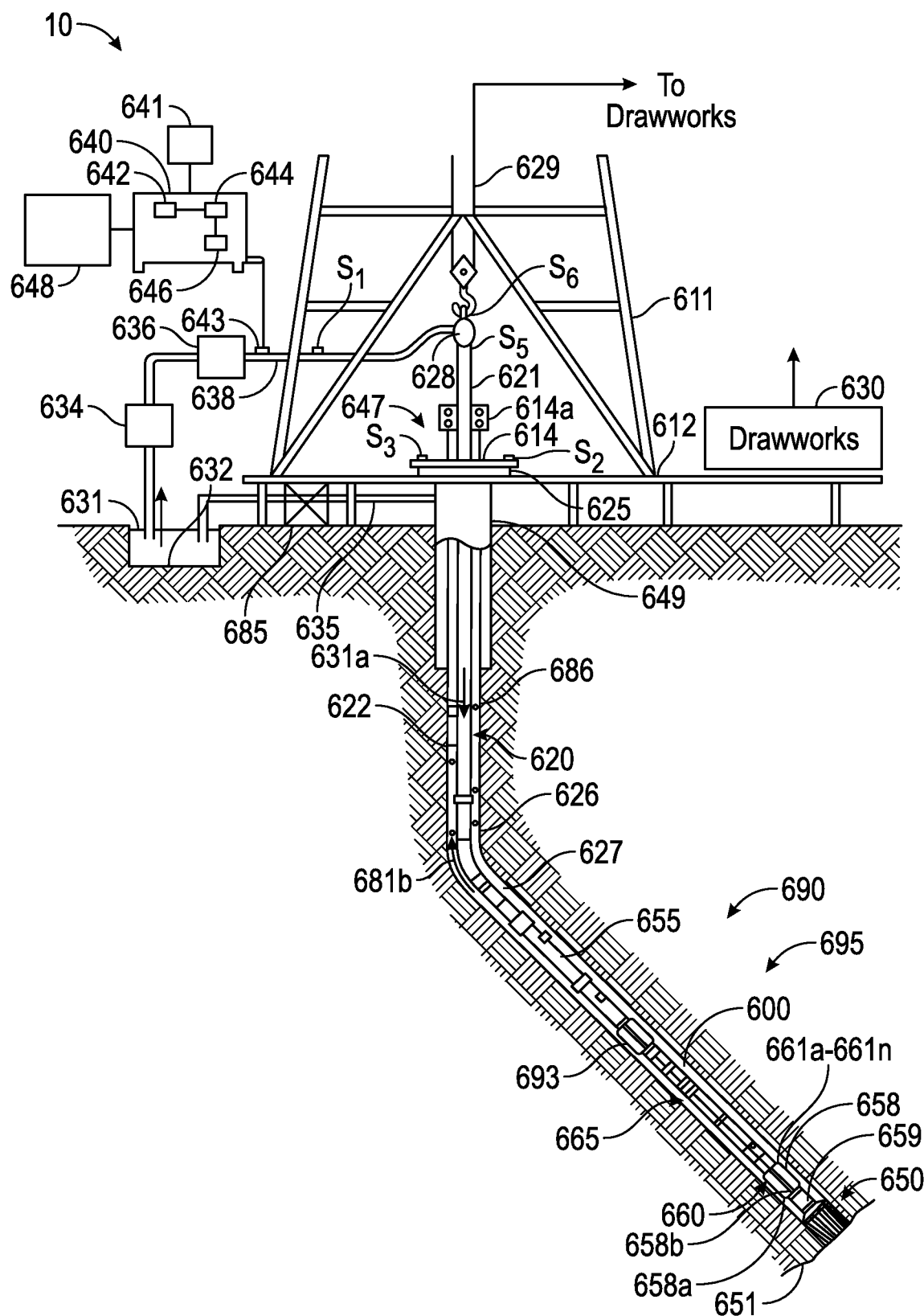
FIG. 6A is a schematic diagram of an example drilling system in accordance with embodiments of the disclosure.

FIG. 6 is a schematic diagram of an example drilling system 10 in accordance with embodiments of the disclosure. FIG. 6 shows a drill string 620 that includes a bottom-hole assembly (BHA) 690 conveyed in a borehole 626. The drilling system 10 includes a conventional derrick 611 erected on a platform or floor 612 which supports a rotary table 614 that is rotated by a prime mover, such as an electric motor (not shown), at a desired rotational speed. A tubing (such as jointed drill pipe 622), having the drilling assembly 690, attached at its bottom end extends from the surface to the bottom 651 of the borehole 626. A drill bit 650, attached to drilling assembly 690, disintegrates the geological formations when it is rotated to drill the borehole 626. The drill string 620 is coupled to a drawworks 630 via a Kelly joint 621, swivel 628 and line 629 through a pulley. Drawworks 630 is operated to control the weight on bit ("WOB"). The drill string 620 may be rotated by a top drive (not shown) instead of by the prime mover and the rotary table 614. Alternatively, a coiled-tubing may be used as the tubing 622. A tubing injector 614a may be used to convey the coiled-tubing having the drilling assembly attached to its bottom end. The operations of the drawworks 630 and the tubing injector 614a are known in the art and are thus not described in detail herein.

A suitable drilling fluid 631 (also referred to as the "mud") from a source 632 thereof, such as a mud pit, is circulated under pressure through the drill string 620 by a mud pump 634. The drilling fluid 631 passes from the mud pump 634 into the drill string 620 via a desurger 636 and the fluid line 638. The drilling fluid 631*a* from the drilling tubular discharges at the borehole bottom 651 through openings in the drill bit 650. The returning drilling fluid 631*b* circulates uphole through the annular space 627 between the drill string 620 and the borehole 626 and returns to the mud pit 632 via a return line 635 and drill cutting screen 685 that removes the drill cuttings 686 from the returning drilling fluid 631*b*. A sensor S1 in line 638 provides information about the fluid flow rate. A surface torque sensor S2 and a sensor S3 associated with the drill string 620 respectively provide information about the torque and the rotational speed of the drill string 620. Tubing injection speed is determined from the sensor S5, while the sensor S6 provides the hook load of the drill string 620.

Well control system 647 is placed at the top end of the borehole 626. The well control system 647 includes a surface blow-out-preventer (BOP) stack 615 and a surface choke 649 in communication with a wellbore annulus 627. The surface choke 649 can control the flow of fluid out of the borehole 626 to provide a back pressure as needed to control the well.

In some applications, the drill bit 650 is rotated by only rotating the drill pipe 622. However, in many other applications, a downhole motor 655 (mud motor) disposed in the BHA 690 also rotates the drill bit 650. The rate of penetration (ROP) for a given BHA largely depends on the WOB or the thrust force on the drill bit 650 and its rotational speed.

A surface control unit or controller 640 receives signals from the downhole sensors and devices via a sensor 643 placed in the fluid line 638 and signals from sensors S1-S6 and other sensors used in the system 10 and processes such signals according to programmed instructions provided to the surface control unit 660. The surface control unit 640 displays desired drilling parameters and other information on a display/monitor 641 that is utilized by an operator to control the drilling operations. The surface control unit 640 may be a computer-based unit that may include a processor 642 (such as a microprocessor), a storage device 644, such as a solid-state memory, tape or hard disc, and one or more computer programs 646 in the storage device 644 that are accessible to the processor 642 for executing instructions contained in such programs. The surface control unit 640 may further communicate with a remote control unit 648. The surface control unit 640 may process data relating to the drilling operations, data from the sensors and devices on the surface, and data received from downhole; and may control one or more operations of the downhole and surface devices. The data may be transmitted in analog or digital form.

The BHA 690 may include a tool 600 configured for performing transient electromagnetic (TEM) measurements. The BHA 690 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 695 surrounding the BHA 690. For convenience, all such sensors are generally denoted herein by numeral 665. The BHA 690 may further include a variety of other sensors and devices 659 for determining one or more properties of the BHA 690, such as vibration, bending moment, acceleration, oscillations, whirl, stick-slip, weight-on-bit, fluid flow rate, pressure, temperature, rate of penetration, azimuth, tool face, drill bit rotation, etc.

The BHA 690 may include a steering apparatus or tool 658 for steering the drill bit 650 along a desired drilling path. In one aspect, the steering apparatus may include a steering unit 660, having a number of force application members 661*a*-661*n*. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 658 having a bent sub and a first steering device 658*a* to orient the bent sub in the wellbore and the second steering device 658*b* to maintain the bent sub along a selected drilling direction. The steering unit 658, 660 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 620 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 693 on the BHA 690. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 642 can process the surface measured data, along with the data transmitted from the downhole processor, to evaluate the formation. While a drill string 620 is shown as a conveyance device for tool 600, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 10 may include a bottomhole assembly and/or sensors and equipment for implementation of embodiments of the present disclosure on either a drill string or a wireline.

A point of novelty of the system illustrated in FIG. 6 is that the surface processor 642 and/or the downhole processor 693 are configured to perform certain methods (discussed below) that are not in the prior art. Surface processor 642 or downhole processor 693 may be configured to control steering apparatus 658, mud pump 634, drawworks 630, rotary table 614, downhole motor 655, other components of the BHA 690, or other components of the drilling system 10. Surface processor 642 or downhole processor 693 may be configured to control sensors described above and to estimate a parameter of interest (e.g., a property of the earth formation) according to methods described herein.

Control of these components may be carried out using one or more models using methods described below. For example, surface processor 642 or downhole processor 693 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 642, downhole processor 693, or other processors (e.g., remote processors) may be configured to operate the TEM tool 600 to induce and measure TEM signals.

Figure 6B:
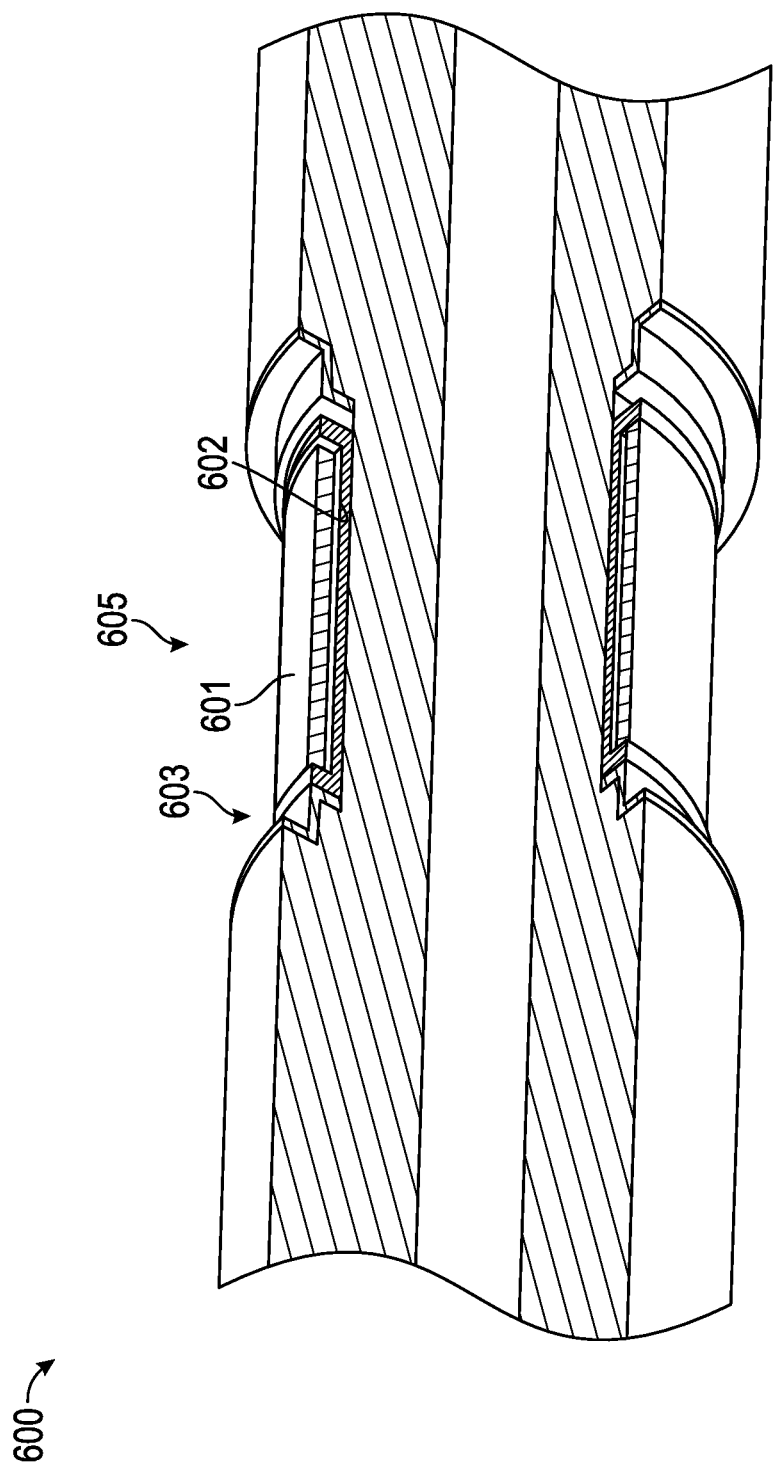
FIG. 6B shows a schematic cut-away view of a tool in accordance with embodiments of the present disclosure.

FIG. 6B shows a schematic cut-away view of a tool in accordance with embodiments of the present disclosure. Tool 600 comprises a plurality of antenna assemblies 605. Each antenna assembly 605 may include magnetostatic shielding 601 (e.g., ferrite) in combination with a highly conductive electromagnetic shielding 602 (e.g., copper) shields in close proximity to the antenna coils (omitted for clarity). The antenna, the magnetostatic shielding and the copper shielding may be positioned in a recess 603 to prevent wear or damage, and may be covered by a metallic or polymer sleeve.

Figure 7:
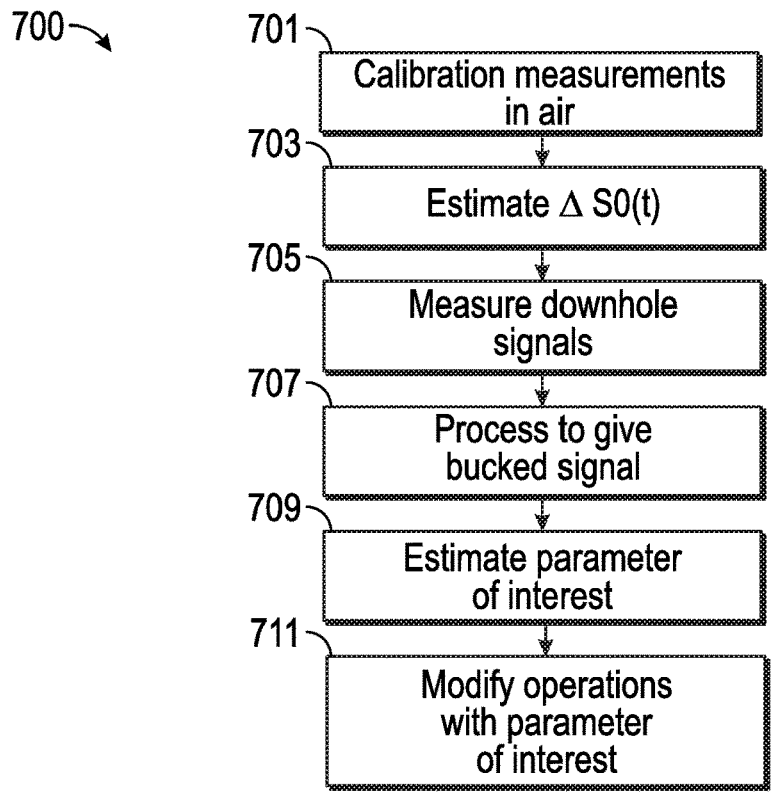
FIG. 7 illustrates a method for estimating a property of the earth formation in accordance with embodiments of the present disclosure.

FIG. 7 illustrates a method 700 for estimating a parameter of interest in accordance with embodiments of the present disclosure. Transient calibration measurements are made 701 in a homogenous zone such as in air (i.e., with no formation around) and two signals attributable to R1 and R2, respectively, are received. At step 703, a differential calibration signal may be estimated using a processor. For example, non-zero differential calibration signal may be computed according to Eqn. 2 using the non-exponentiated correction coefficient, K, determined as described above.

Steps 701 and 703 comprise a calibration mode. At step 705, downhole transient measurements are made and two signals $S_{21}(t)$ and $S_{22}(t)$ are acquired, which correspond to receivers R1 and R2. The measurements may be made sequentially, or the measurement corresponding to R1 may be taken during the measurement corresponding to R2 (e.g., simultaneously). Next, a processor is used to process the two signals $S_{21}(t)$ and $S_{22}(t)$ to estimate the corrected signal. This may be carried out at step 707 according to Eqns. (3) & (6), where K, as calculated in the calibration step above, is used again. Although the first time-dependent TEM signal and the second time-dependent TEM signal include parasitic signal contributions from the tubular, the coefficient K and the non-zero differential calibration signal is configured such that the corrected signal (e.g., $\Delta S_{corrected}(t)$ is substantially free of parasitic signal effects from the tubular.

Steps 705 and 707 constitute the main operational mode. Next, parameters of interest are estimated using the corrected signal at step 709. For example, an inversion of the corrected $\Delta S(t)$ may be done at step 709 giving a result that is substantially unaffected by the conductive pipe to find parameters of interest, such as values of properties of the surrounding formation (e.g., resistivity properties). The parameter of interest for which a value is estimated may include a formation resistivity, a formation conductivity, a formation dielectric constant, a distance to an interface such as water-oil contact, and/or a distance to an interface ahead of the drill formation. Optional step 711 may include using the parameter of interest to conduct further operations in the earth formation. Step 711 may be carried out by modifying drilling operations in the borehole (e.g., geosteering) dependent upon one or more estimated values of the parameter (e.g., distance to interface).

Figure 8:
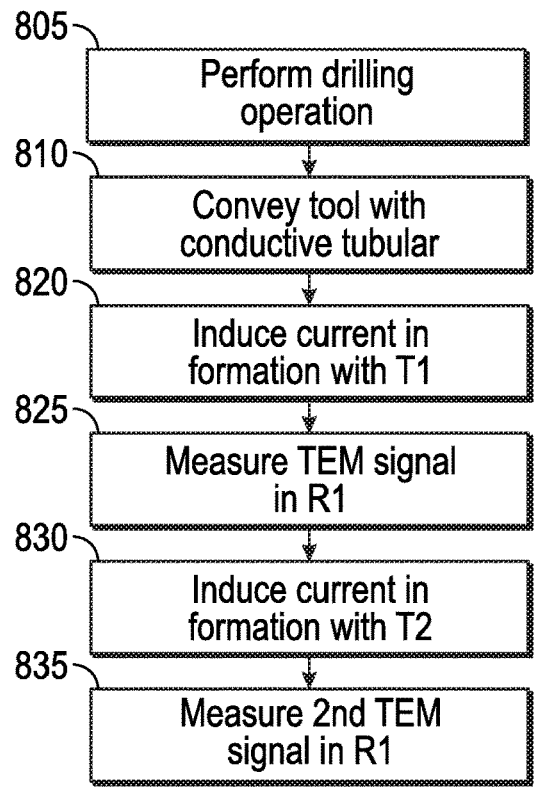
FIG. 8 illustrates an alternative method for making a transient measurement in accordance with embodiments of the present disclosure.

FIG. 8 illustrates an alternative method for making a transient measurement in accordance with embodiments of the present disclosure. Optional step 805 of the method 800 may include performing a drilling operation in a borehole. For example, a drill string may be used to form (e.g., drill) the borehole. Optional step 810 may include conveying a TEM tool 800 having a plurality of transmitters and a receiver on a conductive tubular in the borehole on a carrier. For example, a tool (e.g., tool 100) may be conveyed on the drill string.

Step 820 of the method 800 includes inducing a first current in the earth formation using a first transmitter of the plurality of transmitters. This may be carried out by abruptly changing a magnetic moment of the transmitter in the borehole. Step 825 of the method 800 includes measuring with the receiver a first time-dependent transient electromagnetic (TEM) signal induced by the formation responsive to the first current, which produces a first TEM measurement. The signal may be generated in the receiver (or indicative of the signal generated in the receiver) and caused by the formation responsive to the current.

Step 830 of the method 800 includes inducing a second current in the earth formation using a second transmitter of the plurality of transmitters. This may be carried out by abruptly changing a magnetic moment of the transmitter in the borehole. Step 835 of the method 800 includes measuring with the receiver a second time-dependent transient electromagnetic (TEM) signal induced by the formation responsive to the second current, which produces a second TEM measurement. The signal may be generated in the receiver (or indicative of the signal generated in the receiver) and caused by the formation responsive to the current.

Mathematical models, look-up tables, neural networks, or other models representing relationships between the signals and the values of the parameters of interest (e.g., formation properties) may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

As used above, a processor is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

The conducting tubular as described above may be constructed from conductive materials or reduced conductivity materials. Conductive materials are defined as having a resistivity less than $10^{-5}$ ohm-meters (e.g., copper, silver, steel, etc.). Reduced conductivity materials may have a resistivity between $10^{-5}$ ohm-meters and $10^{-2}$ ohm-meters. Example reduced conductivity materials include composite materials, powdered metals, and so on. One specific type of composite materials includes carbon-reinforced composite materials. These materials have conductive carbon filaments embedded in their matrix material (e.g., resin), which makes them slightly conductive.

By "substantially free of parasitic signal effects" it is meant that the model with a pipe is within a tolerable deviation of the model without a pipe, wherein the deviation is sufficiently low to allow use of TEM signals generated in connection therewith to determine a value of a property of the formation ahead of the bit, examples of such deviation including, for example, less than 5 percent, less than 4 percent, less than 3 percent, less than 2 percent, less than 1 percent, and so on, down to and including zero difference.

The term "predominantly" relates to an amount of current induced in a depth of investigation in the earth formation relative to an amount of current induced in another depth in the earth formation. A predominantly greater amount of current induced in the depth of interest will provide a response of electromagnetic energy that can be related to a property of the earth formation at the depth of investigation. As used herein, the term "predominantly" relates at least to a minimum amount of increase in currents induced at the depth of investigation with respect to other depths, the minimum amount being necessary to be able to estimate a property of the earth formation at the depth of investigation from the response. As used herein, the term "exponentiated" refers to a mathematical expression or number raised to a power of 2 or greater, which is in contrast to the term "non-exponentiated" which refers to a mathematical expression or number equivalent to that expression or number raised to a power of 1.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. A method for evaluating an earth formation intersected by a borehole, the method comprising:
   conveying a tool on a carrier in the borehole, the tool comprising a conducting tubular having a transmitter, a first receiver, and a second receiver disposed thereon in a spaced-apart relationship;
   inducing a current in the earth formation using the transmitter;
   measuring with the first receiver a first time-dependent transient electromagnetic (TEM) signal induced by the earth formation;
   measuring with the second receiver a second time-dependent TEM signal induced by the earth formation; and
   using at least one processor to estimate a corrected time-dependent TEM signal using the first time-dependent TEM signal, the second time-dependent TEM signal, and a correction coefficient (K) estimated as a function of a ratio of distances $r_b$ and $r_m$ raised to a power less than 2, wherein $r_b$ is a distance between the transmitter and the first receiver, and wherein $r_m$ is a distance between the transmitter and the second receiver.

2. The method in accordance with claim 1, wherein the correction coefficient (K) is computed according to $$K = \frac{M_1}{M_2} \frac{r_m}{r_b}$$

where $M_1$ is a magnetic moment of the first receiver, $M_2$ is a magnetic moment of the second receiver.

3. The method in accordance with claim 1, comprising estimating a non-zero differential calibration signal, $\Delta S_0(t)$, using the correction coefficient, K, and signals received at each of the first receiver and the second receiver in response to transmission of an electromagnetic pulse from the transmitter while the carrier is outside of the earth formation.

4. The method in accordance with claim 3, wherein the non-zero differential calibration signal, $\Delta S_0(t)$, is computed according to $$\Delta S_0(t) = S_{12}(t) - K \cdot S_{11}(t)$$

where $S_{11}(t)$ and $S_{12}(t)$ are the signals received at each of the first receiver and the second receiver, respectively, in response to the transmission of the electromagnetic pulse from the transmitter while the carrier is outside of the earth formation.

5. The method in accordance with claim 3, comprising generating the signals received at each of the first receiver and the second receiver using the transmission of the electromagnetic pulse.

6. The method in accordance with claim 3, wherein estimating the corrected time-dependent TEM signal comprises:
   using the first time-dependent TEM signal, the second time-dependent TEM signal, and the correction coefficient (K) to estimate a differential signal $\Delta S(t)$; and
   estimating the corrected time-dependent TEM signal, $\Delta S_{corrected}(t)$, using the differential signal $\Delta S(t)$ and the non-zero differential calibration signal, $\Delta S_0(t)$.

7. The method in accordance with claim 6, wherein the corrected time-dependent TEM signal, $\Delta S_{corrected}(t)$, is computed according to $$\Delta S_{corrected}(t) = \Delta S(t) - \Delta S_0(t).$$

8. The method of claim 3 wherein the first time-dependent TEM signal and the second time-dependent TEM signal include parasitic signal contributions from the conducting tubular, and the non-zero differential calibration signal, $\Delta S_0(t)$ is configured such that the corrected time-dependent TEM signal, $\Delta S_{corrected}(t)$, is substantially free of parasitic signal effects from the conducting tubular.

9. The method of claim 1 comprising using the at least one processor to estimate a parameter of interest of the earth formation using the corrected time-dependent TEM signal.

10. The method of claim 9 comprising using the parameter of interest of the earth formation to conduct further operations in the earth formation.

11. The method of claim 9 wherein the parameter of interest of the earth formation is selected from: (i) a resistivity of the earth formation, (ii) a conductivity of the earth formation, (iii) a dielectric constant of the earth formation, and (iv) a distance to an interface in the earth formation that has a resistivity contrast across the interface.

12. The method of claim 9 wherein the carrier further comprises a bottomhole assembly including a drill bit, and the parameter of interest comprises a distance to an interface in the earth formation, the method further comprising controlling a direction of drilling of the bottomhole assembly using the estimated distance to the interface.

13. The method of claim 1 wherein the first receiver comprises a first coil having a first number of turns of a wire and the second receiver comprises a second coil having a second number of turns of the wire different than the first number of turns.

14. The method of claim 1 wherein the conducting tubular comprises at least one reduced conductivity composite material.

15. An apparatus for use in a borehole in an earth formation, comprising:
   a tool on a carrier in the borehole, the tool comprising a conducting tubular;
   a transmitter disposed on the conducting tubular and configured to induce a current in the earth formation while the tool is in the borehole;
   a first receiver and a second receiver disposed on the conducting tubular in a spaced-apart relationship, wherein the first receiver and the second receiver are each configured to measure a respective first and second time-dependent transient electromagnetic (TEM) signal induced by the earth formation responsive to the current;
   at least one processor configured to estimate a corrected time-dependent TEM signal using the first time-dependent TEM signal, the second time-dependent TEM signal, and a correction coefficient (K) estimated as a function of a ratio of distances $r_b$ and $r_m$ raised to a power less than 2, wherein $r_b$ is a distance between the transmitter and the first receiver, and wherein $r_m$ is a distance between the transmitter and the second receiver.

16. The apparatus of claim 15 wherein the carrier further comprises a bottomhole assembly including a drill bit, and the processor is configured to estimate a distance to an interface in the earth formation, and the at least one processor is configured to control a direction of drilling of the bottomhole assembly using the estimated distance to the interface.

17. A method for evaluating an earth formation intersected by a borehole, the method comprising:
   conveying a tool on a carrier in the borehole, the tool comprising a conducting tubular having a first transmitter, a second transmitter, and a receiver disposed thereon in a spaced-apart relationship;

inducing a first current in the earth formation using the first transmitter;

measuring with the receiver a first time-dependent transient electromagnetic (TEM) signal induced by the earth formation;

inducing a second current in the earth formation using the second transmitter;

measuring with the receiver a second time-dependent TEM signal induced by the earth formation; and using at least one processor to estimate a corrected time-dependent TEM signal using the first time-dependent TEM signal, the second time-dependent TEM signal, and a correction coefficient (K) estimated as a function of a ratio of distances $r_b$ and $r_m$ raised to a power less than 2, wherein $r_b$ is a distance between the transmitter and the first receiver, and wherein $r_m$ is a distance between the transmitter and the second receiver.

* * * * *